United States Patent [19]

Popp

[11] 4,007,664
[45] Feb. 15, 1977

[54] HYDRAULIC BOOSTER

[75] Inventor: Roger C. Popp, Chesaning, Mich.

[73] Assignee: Midland-Ross Corporation, Cleveland, Ohio

[22] Filed: Sept. 26, 1975

[21] Appl. No.: 617,198

[52] U.S. Cl. .................................. 91/49; 91/369 B; 91/372; 91/413; 91/431; 91/449
[51] Int. Cl.² ...................... F15B 9/10; F15B 13/06
[58] Field of Search ............. 91/431, 372, 373, 49, 91/369 B, 413, 449

[56] References Cited

UNITED STATES PATENTS

| | | | |
|---|---|---|---|
| 3,148,592 | 9/1964 | Schultz et al. | 91/431 |
| 3,482,485 | 12/1969 | Abbot | 91/372 |
| 3,502,001 | 3/1970 | Moore | 91/431 |
| 3,661,054 | 5/1972 | Brown | 91/369 B |
| 3,810,680 | 5/1974 | Schenk | 303/6 C |
| 3,813,992 | 6/1974 | Brown | 91/369 B |

Primary Examiner—Paul E. Maslousky
Attorney, Agent, or Firm—H. Duane Switzer

[57] ABSTRACT

A hydraulic booster has its piston located in a normal passive position so that hydraulic fluid supplied to the cylinder through an inlet port enters the cylinder on both sides of the piston. Normally open valve means establishes communication through the piston from one side thereof to the other, and operating means is provided for closing the valve means and moving the piston past the inlet port to a position wherein hydraulic fluid flows through the inlet port into the cylinder on only one side of the piston. The normally open valve means includes an elongated valve sleeve slidably mounted in a piston bore having an enlarged intermediate portion defining a cavity surrounding the sleeve member. The sleeve member has a large external area within the cavity facing in one direction than in the other direction, and a leakage path is provided for communication of the cavity with the cylinder on one side of the piston. Pressurization of the cavity causes fluid pressure to act on the larger external area of the sleeve member for biasing same in one direction with a force proportional to the pressure acting on the piston.

10 Claims, 2 Drawing Figures

HYDRAULIC BOOSTER

BACKGROUND OF THE INVENTION

This application pertains to the art of boosters and, more particularly, to boosters of the type commonly used in power braking systems for vehicles. The invention is particularly applicable to a combined hydraulic and vacuum booster. However, it will be appreciated that certain aspects of the present invention may be used in hydraulic boosters alone and in devices other than power brake systems for vehicles.

Hydraulic boosters commonly have an inlet port communicating with a cylinder on only one side of the piston, with hydraulic fluid flowing through a normally open valve in the piston when the booster is not energized. Flow of all the hydraulic fluid through the valve in the piston requires a relatively large valve, particularly when the hydraulic fluid is cold and has a high viscosity. A large valve through the piston provides poor controllability and the valve tends to oscillate. Minimizing oscillation of the large valve requires complicated balancing of the valve and maintenance of close tolerances. The piston bypass feature allows the use of a small valve yet permits adequate flow of cold fluid when booster is in passive position.

In hydraulic boosters of the type described, the valve itself does not operate to provide feedback forces to the brake operating means for providing an indication at the brake pedal of the force being produced by the hydraulic booster.

SUMMARY OF THE INVENTION

A hydraulic booster includes a cylinder having a piston received therein for movement from a passive position adjacent one end of the cylinder to force output positions toward the other end of the cylinder. Normally open valve means establishes communication through the piston from one side thereof to the other. Hydraulic fluid return port means communicates with the cylinder adjacent the other end thereof, and hydraulic fluid supply port means communicates with the cylinder adjacent the one end thereof. In its passive position, the piston is located with respect to the supply port means for flow of hydraulic fluid through the supply port means directly into the cylinder on both sides of the piston. Operating means closes the valve means in the piston and moves the piston past the supply port means to a position wherein hydraulic fluid flows through the supply port means into the cylinder on only one side of the piston.

With an arrangement of the type described, it is possible to use a relatively small valve through the piston for providing very good modulation; yet, in conjunction with piston bypass means, provides adequate flow passage to reduce backpressure when cold, high viscosity oil is flowing.

In one arrangement, a vacuum booster is mounted coaxially in series with the hydraulic booster, and the operating means momentarily energizes the vacuum booster with substantially less than its full force potential to move the hydraulic piston past the supply port means.

The piston preferably has a circumferential groove receiving a cast iron sealing ring engaging the inner wall of the cylinder. Elastomeric seals tend to be damaged or displaced due to movement of the piston past the supply port means.

The valve means through the piston includes a sleeve member mounted for axial movement in a bore in the piston. The bore has an enlarged intermediate portion defining a cavity surrounding the sleeve member. Yieldable biasing means in the cavity normally biases the sleeve member in one direction toward one end of the cylinder. Leakage path means establishes communication of the cavity with the cylinder on one side of the piston to pressurize the cavity and bias the sleeve member in the one direction with a force proportional to the pressure acting on the piston.

The improved arrangement of the present application is particularly useful in a vehicle braking system which includes wheel lock control means for sensing incipient wheel lock of the vehicle rear wheels to cause a decrease of brake apply pressure at the rear wheels to permit such wheels to roll within a desirable range of percent slip instead of locking. A wheel lock control unit in which the improved booster of this application can be used is disclosed in U.S. Pat. No. 3,810,680 issued May 14, 1974, to Schenk.

It is a principal object of the present invention to provide an improved hydraulic booster.

It is a further object of the invention to provide a hydraulic booster having a normally open valve through the piston for providing very good modulation and controllability.

It is an additional object of the invention to provide a hydraulic booster which is initially energized by momentary operation of a coaxially mounted series connected vacuum booster to substantially less than its full force potential.

It is a further object of the invention to provide a hydraulic booster having a movable valve sleeve which is biased with a force proportional to the hydraulic pressure acting on the booster piston, requiring reduced spring bias forces, resulting in a smaller, less costly mechanism.

DESCRIPTION OF A PREFERRED EMBODIMENT

Figure 1:
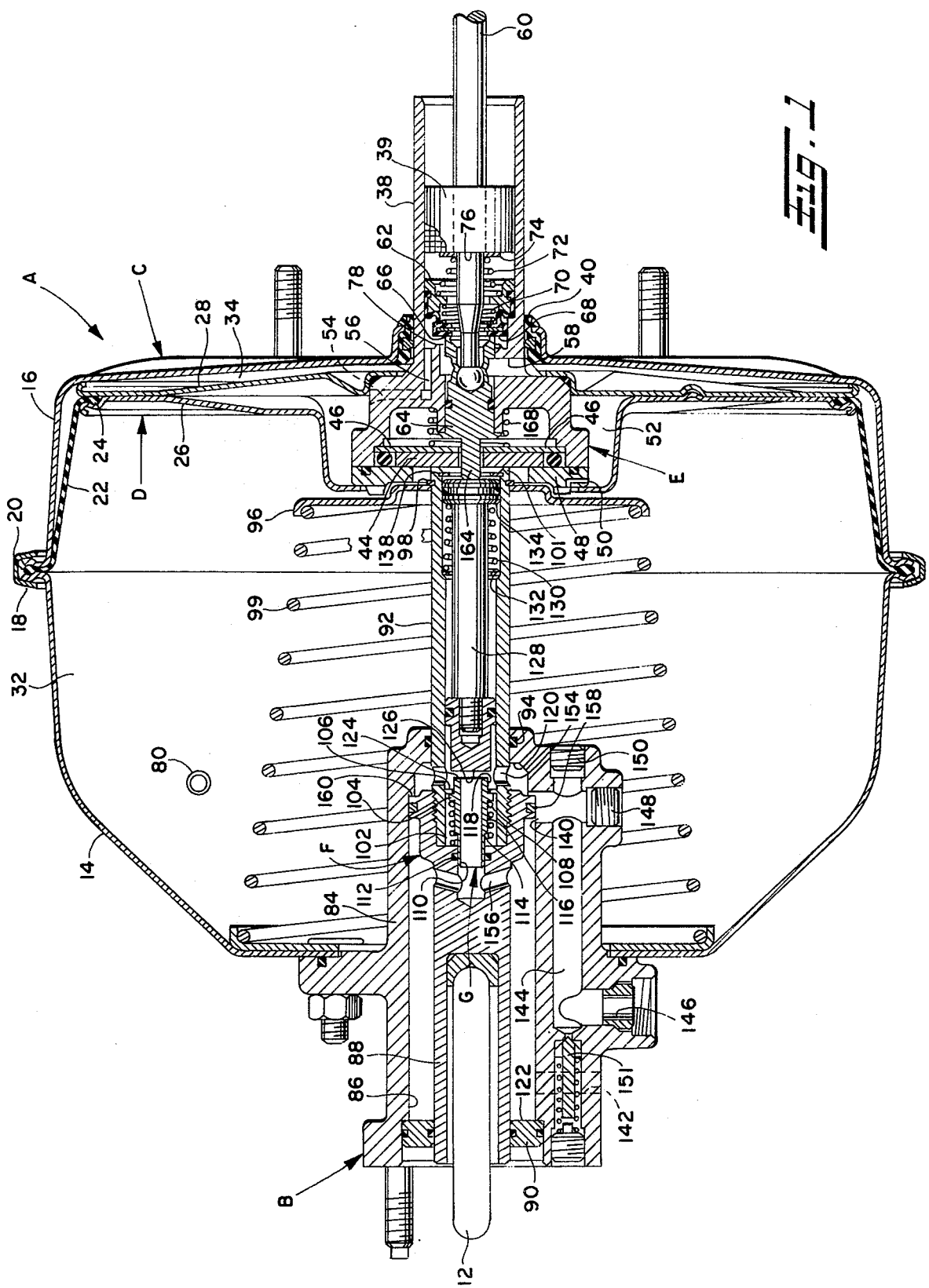
FIG. 1 is a cross-sectional elevational view of a combined hydraulic and vacuum booster constructed in accordance with the present invention.

With reference to the drawing, FIG. 1 shows a combined hydraulic and vacuum booster A which includes a hydraulic booster B and a vacuum booster C coaxially mounted in series with one another and having a common force output member 12.

Vacuum booster C is of a known type as described by way of example in U.S. Pat. No. 3,628,422 issued Dec. 21, 1971, to Acre. Vacuum booster C includes housing parts 14 and 16 secured together as by clamping band 18 and gripping a circumferential outer bead 20 of a flexible diaphragm 22 having a circumferential inner bead 24 clamped between diaphragm plates 26 and 28 which are suitably secured together as by spot welding or the like. Diaphragm 22, and plates 26 and 28, cooperate to define a movable diaphragm generally indicated by letter D. First and second chambers 32 and 34 are defined on opposite sides of diaphragm D within housing parts 14 and 16.

A hub member E is mounted between the longitudinally spaced-apart inner end portions of diaphragm plates 26 and 28, and includes an elongated cylindrical sleeve portion 38 extending through a suitable seal 40 in housing part 16. The interior of sleeve portion 38 is open to atmosphere through a filter 39.

Hub member E has a forward cavity receiving a rectangular bridge member 44 and a pair of rectangular levers 46 retained in the cavity by a cover member 48. Passages generally indicated at 50 provide communication between chamber 32 and an annular cavity 52 surrounding hub member E between the inner end portions of diaphragm plates 26 and 28. A generally radial passage 54 in hub member E provides communication between annular cavity 52 and an axial passage 56 communicating with the interior of sleeve 38. Another generally radially extending passage 58 provides communication of chamber 34 with either chamber 32 or atmosphere depending upon the position of a valve.

Operating means for energizing booster A includes an elongated reciprocable rod 60 extending through filter 39 which is press fit or otherwise secured within sleeve portion 38 against axial movement relative thereto. Rod 60 extends through a member 62 which is also press fit or otherwise secured within sleeve portion 38 against axial movement relative thereto. Operating rod 60 is suitably secured to a member 64 having a seat 66 for cooperation with a bellows-like valve member 68 secured to member 62 and normally biased to the left in FIG. 1 by a coil spring 70. Another coil spring 72 acts between member 62 and a washer 74 bearing against shoulder 76 on rod 60. Member 64 is slidable in a bore having a seat 78.

Chamber 32 is normally connected to a source of vacuum as generally indicated at 80. In the position of the parts shown in FIG. 1, chamber 32 is in communication with chamber 34 through passages 50, annular cavity 52, passage 54, passage 56, past seat 78 and through passage 58. When operating rod 60 is moved to the left in FIG. 1, valve member 68 will contact seat 78 for blocking communication between chambers 32 and 34 because passage 56 can no longer communicate past seat 78 with passage 58. Slight further movement of rod 60 to the left will move seat 66 on member 64 away from valve 68 so that atmospheric pressure communicates through sleeve portion 38 past central openings in member 62 and valve 68, then past seat 66 with passage 58 for exposing chamber 34 to atmospheric pressure for moving diaphragm D to the left.

Hydraulic booster B includes a housing 84 suitably secured to housing part 14 and having a cylindrical bore 86. A piston F reciprocatingly mounted within bore 86 has an extended portion 88 guided through a fixed seal 90 in bore 86 and carries force output member 12 which is connected in a known manner for operating a master cylinder to operate the vehicle brakes.

A guide sleeve 92 secured to piston F slidably extends through a suitable seal 94 in hydraulic booster housing 84. A disc 96 positioned on sleeve 92 acts against a snap ring 98 on sleeve 92 under force supplied by coil spring 99 for normally shifting piston F and diaphragm D to the positions shown in FIG. 1. End 101 of sleeve 92 bears against bridge member 44 in hub E.

Sleeve 92 has a hollow portion 102 within piston F reciprocatingly receiving a valve sleeve G having an outwardly extending circumferential shoulder 104 normally biased against an inwardly extending circumferential shoulder 106 on sleeve 92 by a spring 108. Valve sleeve G has a small diameter end portion 110 slidable relative to a seal 112 and an outwardly stepped portion 114 within cavity 102 forming a larger diameter portion 116. The other end portion 118 of valve sleeve G on the opposite side of shoulder 104 has a still larger diameter than portion 116. With this arrangement, valve sleeve G has a smaller external area facing generally toward one end 120 of cylinder B than toward other end 122 thereof. Valve sleeve G has a circumferential inwardly inclined seat 124 for cooperation with a flat end 126 on piston rod 128 which is normally biased to the right in FIG. 1 by a coil spring 130 acting on a snap ring 132 positioned within sleeve 92 and against a shoulder 134 on piston rod 128. A snap ring 138 positioned within sleeve 92 adjacent end 101 thereof prevents displacement of piston rod 128 from within sleeve 92.

An inlet port 140 communicates with cylinder bore 86 adjacent one end 120 thereof and an outlet port 142 communicates therewith adjacent other end 122 thereof. A passage 144 provides communication between inlet port 140 and another port 146 which is connected to a hydraulic pump. Plugs 148 and 150 are provided in housing 84 to close the openings formed by drilling inlet port 140 and passage 144. A pressure relief valve 151 is provided communicating between passage 144 and outlet port 142. Sleeve 92 has lateral ports as at 154 to establish communication from one side of piston F to the other side thereof through valve sleeve G and lateral ports 156 in piston extension portion 88. Piston F has a cast iron sealing ring 158 positioned within a circumferential groove therein and engaging the wall of cylinder bore 86. The axial length of piston F engaging the wall of cylinder bore 86 is less than the diameter of inlet port 140, and piston F is normally maintained in the position shown against a shoulder 160 in bore 86 with inlet port 140 open to cylinder bore 86 on both sides of piston F.

Member 64 within hub E has an extension 164 extending through a suitable hole in bridge member 44 and engaging piston rod 128. A coil spring 168 acts between hub E and reaction levers 46 for normally maintaining such levers flat against bridge member 44 as shown in FIG. 1.

Hydraulic piston F normally occupies a passive position adjacent one end 120 of cylinder B and is movable toward other end 122 thereof to working positions. With a hydraulic pump operating for supplying hydraulic fluid through inlet port 140, the hydraulic fluid flowing into bore 86 on one side of piston F is simply returned to reservoir through outlet port 142. The hydraulic fluid flowing through inlet port 140 to the right hand side of piston F flows through ports 154, past seat 124, through valve sleeve G, through ports 156 and into cylinder bore 86 on the left hand side of piston F for return to reservoir through outlet port 142.

In the preferred arrangement, the distance between seat 124 on valve sleeve G and flat end 126 of piston rod 128 is somewhat less than the distance between member 64 and reaction levers 46, and between valve 68 and seat 78. When the brakes are operated, rod 60 moves to the left in FIG. 1 so that valve 68 moves under the influence of spring 70 toward seat 78 and member 64 moves toward reaction levers 46. At the same time, extension 164 on member 64 acts against piston rod 128 for moving same to the left until flat end 126 engages seat 124 to close the interior of valve sleeve G against flow of hydraulic fluid therethrough. At this time, piston F will still not move because there will be substantially no pressure build up on the right hand side of piston F due to the fact that inlet port 140 is freely open to reservoir on the opposite side of piston F. Further movement of operating rod 60 will cause valve 68 to engage seat 78 and seat 66 will move away from valve 68 for closing chamber 34 against communication with the vacuum in chamber 32 and opening chamber 34 to communication with atmospheric pressure through hollow sleeve 38. Diaphragm D will then begin moving to the left in FIG. 1 and bridge member 44 acts against end 101 of sleeve 92 for moving piston F to the left until it is past inlet port 140. During this operation, which occurs very rapidly, chamber 34 is only open to atmosphere momentarily so that vacuum booster C is energized to substantially less than its full force potential. As soon as piston F is in a position wherein inlet port 140 is substantially completely on the right hand side of piston F, hydraulic pressure will begin moving piston F to the left. Diaphragm D and hub E will follow sleeve 92 due to the partial pressurization within chamber 34, and this movement of hub E will overtake the movement of operating rod 60 and member 64 until valve 68 is seated against both of seats 66 and 78 so that the vacuum booster valve is in a lapped position wherein chamber 34 is not communicating with atmosphere or with chamber 32, and is only partially pressurized to a pressure substantially less than atmospheric. During operation of hydraulic piston F, the vacuum valve will normally remain in this lapped position until the full force of hydraulic booster B is being applied, or until additional braking force is necessary, whereupon further movement to the left of operating rod 60 again causes member 64 to move relative to hub E so that seat 66 moves away from valve 68 and again opens chamber 34 to atmospheric pressure so that vacuum booster C is energized to substantially its full force potential.

The overtravel provided for valve sleeve G prevents extremely large forces from being applied through flat end 126 of piston rod 128 against seat 124, and allows sufficient movement of piston rod 128 after seating against seat 124 to partially operate vacuum booster C. Once piston F is moved to the left past inlet port 140, hydraulic fluid leaks past valve sleeve end portion 118, and shoulders 104 and 106 into cavity 102. This hydraulic pressure acting on stepped portion 114 and the left hand side of shoulder 104 is greater than the pressure acting against the right hand side of shoulder 104 so that the hydraulic pressure biases valve sleeve G to the right during operation of hydraulic booster B aiding spring 108 in firmly holding seat 124 in engagement with shoulder 106.

The arrangement described for initiating operation of hydraulic booster B by first momentarily energizing vacuum booster C to substantially less than its full force potential is a preferred arrangement. However, it will be recognized that it is possible to move piston F completely to the left of inlet port 140 only through force applied by operating rod 60, or to initially locate piston F completely to the left of inlet port 140 with all of the hydraulic fluid flow normally traveling through valve sleeve G until flat end 126 of piston rod 128 seats against seat 124. In cold weather operation, the hydraulic fluid has a greater viscosity and this can create problems if piston F is located completely to the left of inlet port 140 in its passive position because valve sleeve G would have to be much larger to handle all of the flow. Making such valve larger affords very poor controllability and the valve will oscillate so good modulation is not possible. The cold flow problem advises one to make the valve sleeve larger, while the oscillation problem tells one to make the valve sleeve smaller. The arrangement for locating piston F in its passive position so that hydraulic fluid flows through inlet port 140 on both sides thereof solves the cold flow and oscillation problems. However, it is possible to provide a larger valve sleeve with other compensating arrangements to minimize oscillation, while locating piston F in its passive position completely to the left of inlet port 140.

In the arrangement shown and described, valve sleeve G and its seat 124 cooperate with flat end 126 of piston rod 128 to generally define a hydraulic booster operating valve. Valve member 68, and seats 66 and 78 generally define a vacuum booster operating valve. Such valves are operated by a common operating means generally defined by operating rod 60. This operating means is operative to energize the hydraulic and vacuum boosters in sequence for first applying substantially the full force of the hydraulic booster and then applying the force of the vacuum booster. This is accomplished by first operating the hydraulic booster valve for energizing the hydraulic booster and subsequently operating the vacuum booster valve for energizing the vacuum booster. In the preferred arrangement as described, the hydraulic valve is normally open for bypassing hydraulic fluid through valve sleeve G from one side to the other of piston F. The operating means first closes the hydraulic valve and then momentarily energizes the vacuum booster C with substantially less than its full force potential so that vacuum booster diaphragm D simply follows the hydraulic booster without supplying any significant force to force output member 12 until substantially the full force of hydraulic booster B is applied to force output member 12, whereupon vacuum booster C is energized to substantially its full force potential by opening of its valve.

As previously explained, valve sleeve G is mounted for axial movement relative to piston F and is normally biased in one direction toward piston rod 128 by yieldable biasing means defined by spring 108. Valve sleeve G is yieldable in an opposite direction to the left in FIG. 1 when piston rod end 126 engages seat 124 in order to accommodate overtravel of piston rod 128. It has been found highly desirable to use a cast iron piston ring 158 because an elastomeric ring may be displaced or damaged as it moves past inlet port 140.

Sleeve 92 may be considered as being a part of piston F, with the internal opening through shoulder 106 and the opening past seal 112 defining a bore in piston F. With the bore so defined, the intermediate portion of such bore is enlarged to define cavity 102 surrounding the valve sleeve member G. With the diameters of valve sleeve G arranged as previously described, such valve sleeve member has a larger external area within cavity 102 facing generally toward other cylinder end 122 than toward one cylinder end 120. Leakage path means is provided past the exterior of sleeve end portion 118 and shoulder 106 into cavity 102 for pressurizing cavity 102 in one direction toward one cylinder end 120 with a force proportional to the pressure acting on piston F.

Figure 2:
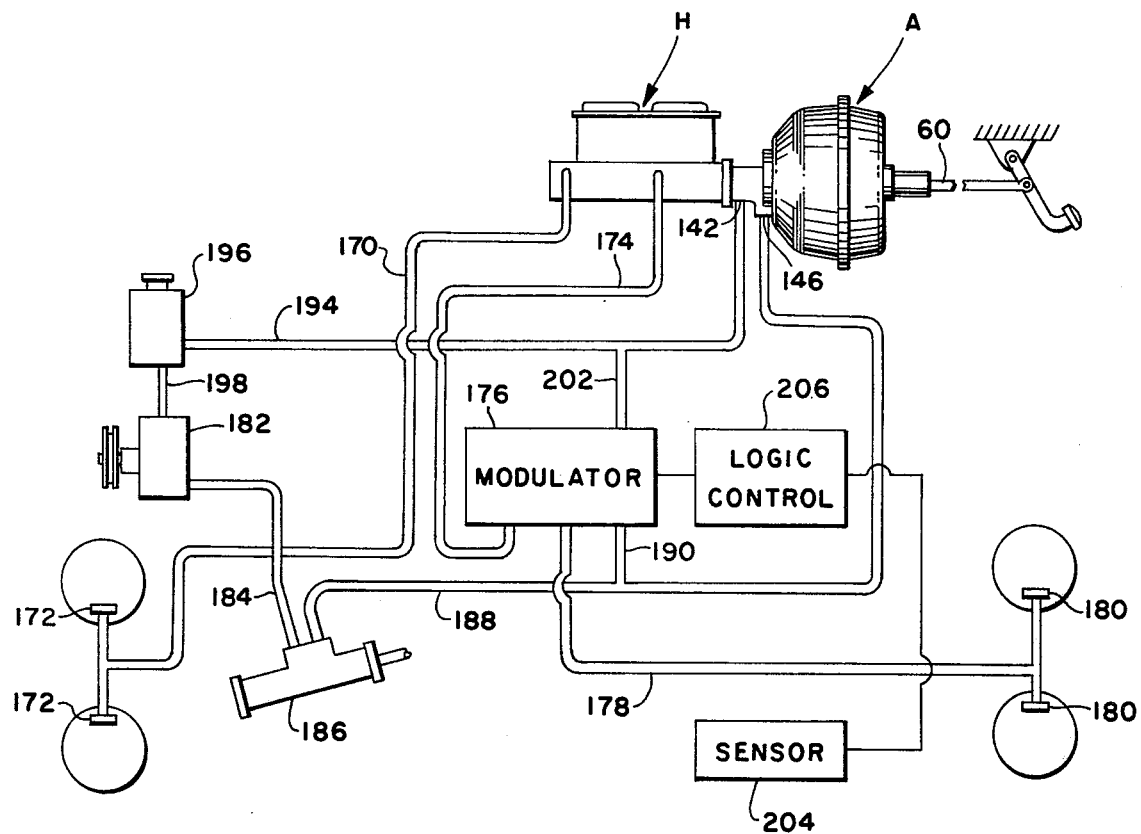
FIG. 2 is a diagrammatic illustration of a wheel lock control system having the improved booster of the present invention incorporated therein.

FIG. 2 schematically shows the improved combined hydraulic and vacuum booster of the present application incorporated in a wheel lock control system. Combined booster A is connected with a master cylinder H having a conduit 170 connected with front wheel brakes 172, and a conduit 174 connected through modulator 176 and conduit 178 with rear wheel vehicle brakes 180. Hydraulic pump 182 supplies hydraulic fluid through conduit 184 to power steering unit 186 and then through conduit 188 to inlet 146 of booster A. A branch line 190 connects conduit 188 with modulator 176. A return conduit 194 connected with booster outlet port 142 communicates with reservoir 196 connected with pump 182 by conduit 198. A branch conduit 202 connects return conduit 194 with modulator 176. Sensor 204 and logic control 206 are connected with modulator 176. As is well known, sensor 204 may sense incipient wheel lock of the rear wheels and send appropriate signals through logic control 206 for generating wheel lock control signals for modulator 176. The signal actuates modulator 176 to cause a decrease of brake apply pressure at the rear vehicle wheel brakes so the rear wheels are permitted to roll within a desirable range of percent wheel slip instead of locking.

In previous arrangements of the type described where a vacuum booster was first energized to substantially its full force potential before energization of the hydraulic booster, an additional pump or special valving and control devices were necessary for operating the modulator at low brake force applications. In accordance with the present application, the hydraulic booster is energized first so that full hydraulic pressure is available to operate modulator 176 and the wheel lock control system at all times, including very low braking force applications.

The described arrangement whereby hydraulic pressure acts on valve sleeve G for biasing same to the right in FIG. 1 makes it possible to use a much smaller spring 108 than would otherwise be possible. When hydraulic booster B is energized, hydraulic pressure is acting tending to move valve sleeve G to the left in FIG. 1 away from flat end 126 of piston rod 128. The greater force acting on the larger oppositely facing areas of valve sleeve G within cavity 102 aids spring 108 in firmly holding seat 124 in engagement with shoulder 106 of sleeve 92. This arrangement enabling use of a much lighter and smaller spring considerably reduces the cost of the valving, and also saves considerable space.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A hydraulic booster comprising; a cylinder having a piston received therein for movement from a passive position adjacent one end of said cylinder to force output positions toward the other end of said cylinder, normally open valve means for establishing communication through said piston from one side to the other thereof, hydraulic fluid return port means communicating with said cylinder adjacent said other end of said cylinder, hydraulic fluid supply port means communicating with said cylinder adjacent said one end thereof, said piston in said passive position thereof being located with respect to said supply port means for flow of hydraulic fluid through said supply port means directly into said cylinder on both sides of said piston so that fluid flows through said supply port means into said cylinder on both sides of said piston not only by flowing through said valve means from one side to the other of said piston but by flowing directly from said supply port means into said cylinder on both sides of said piston means and would so flow in said passive position of said piston even if said valve means were closed, and operating means for closing said valve means and moving said piston past said supply port means to a position wherein hydraulic fluid flows through said supply port means into said cylinder only between said piston and said one end of said cylinder.

2. The booster of claim 1 including a vacuum booster mounted coaxially in series with said hydraulic booster, said operating means being operative to first close said valve means and then momentarily energize said vacuum booster with substantially less than its full force potential to move said piston past said supply port means.

3. A hydraulic booster comprising; a cylinder having a piston received therein for movement from a passive position adjacent one end of said cylinder to force output positions toward the other end of said cylinder, normally open valve means for establishing communication through said piston from one side to the other thereof, operating means for closing said valve means, hydraulic fluid return port means communicating with said cylinder adjacent said other end of said cylinder for bleeding hydraulic fluid from said cylinder between said other end thereof and said other side of said piston, hydraulic fluid supply port means communicating with said cylinder adjacent said one end thereof for supplying hydraulic fluid to said cylinder between said one end thereof and said one side of said piston, said valve means including a sleeve member mounted for axial movement in a bore in said piston, said bore having an enlarged intermediate portion defining a cavity surrounding said sleeve member, yieldable biasing means in said cavity for normally biasing said sleeve member in one direction toward said one end of said cylinder, said sleeve member having a larger external area in said cavity facing generally toward said other end of said cylinder than toward said one end of said cylinder, and leakage path means for providing communication of said cavity with said cylinder between said one end thereof and said one side of said piston to pressurize said cavity and bias said sleeve member in said one direction by pressure acting on said larger area with a force proportional to the pressure acting on said one side of said piston.

4. The booster of claim 3 wherein said sleeve member is generally cylindrical and has one sleeve end portion positioned generally toward said one cylinder end and an opposite sleeve end portion positioned generally toward said other cylinder end, said one sleeve end portion having a larger external diameter than said opposite sleeve end portion, and sealing means only between said opposite sleeve end portion and said bore so that said leakage path means is defined between the exterior surface of said one sleeve end portion and said bore.

5. The booster of claim 4 wherein said sleeve member has a seat end facing toward said one cylinder end and said operating means includes an elongated movable rod having a rod end facing said seat end for engaging same.

6. The booster of claim 3 wherein said piston in said passive position thereof is located with respect to said supply port means for flow of hydraulic fluid through said supply port means directly into said cylinder on opposite sides of said piston, said operating means being for moving said piston past said supply port means to a position wherein hydraulic fluid flows through said supply port means into said cylinder only between said one side of said piston and said one end of said cylinder.

7. The booster of claim 6 including a vacuum booster mounted coaxially in series with said hydraulic booster, said operating means being operative to first close said valve means and then momentarily energize said vacuum booster with substantially less than its full force potential to move said piston past said supply port means.

8. A hydraulic booster comprising; a cylinder having a piston received therein for movement from a passive position adjacent one end of said cylinder to force output positions toward the other end of said cylinder, normally open valve means for establishing communication through said piston from one side to the other thereof, hydraulic fluid return port means communicating with said cylinder adjacent said other end of said cylinder, hydraulic fluid supply port means communicating with said cylinder adjacent said one end thereof, said piston in said passive position thereof being located with respect to said supply port means for flow of hydraulic fluid through said supply port means directly into said cylinder on both sides of said piston, operating means for closing said valve means and moving said piston past said supply port means to a position wherein hydraulic fluid flows through said supply port means into said cylinder only between said piston and said one end of said cylinder, said valve means including a sleeve member mounted for axial movement in a bore in said piston, said bore having an enlarged intermediate portion defining a cavity surrounding said sleeve member, yieldable biasing means in said cavity for normally biasing said sleeve member in one direction toward said one end of said cylinder, said sleeve member having a larger external area within said cavity facing generally toward said other end of said cylinder than toward said one end of said cylinder, and leakage path means for providing communication of said cavity with said cylinder between said one end thereof and said piston to pressurize said cavity and bias said sleeve member in said one direction by pressure acting on said larger area with a force proportional to the pressure acting on said piston.

9. The booster of claim 8 wherein said sleeve member is generally cylindrical and has one sleeve end portion positioned generally toward said one cylinder end and an opposite sleeve end portion positioned generally toward said other cylinder end, said one sleeve end portion having a larger external diameter than said opposite sleeve end portion, and sealing means only between said opposite sleeve end portion and said bore so that said leakage path means is defined between the exterior surface of said one sleeve end portion and said bore.

10. The booster of claim 9 wherein said sleeve member has a seat end facing toward said one cylinder end and said operating means includes an elongated movable rod having a rod end facing said seat end for engaging same.

* * * * *